United States Patent [19]

Hannon et al.

[11] 4,330,672

[45] May 18, 1982

[54] THERMOPLASTIC ELASTOMER POWDER COATINGS

[75] Inventors: Martin J. Hannon, Martinsville; Rajal M. Vyas, North Plainfield; Rudolph R. Schwarz, West Orange, all of N.J.

[73] Assignee: Celanese Corporation, New York, N.Y.

[21] Appl. No.: 201,658

[22] Filed: Oct. 28, 1980

[51] Int. Cl.³ .......................... C08C 2/02; C08C 3/02
[52] U.S. Cl. .................................... 528/493; 528/491; 528/494; 528/495; 528/499; 528/502
[58] Field of Search ............... 528/493, 491, 499, 494, 528/495, 502

[56] References Cited

U.S. PATENT DOCUMENTS

| | | |
|---|---|---|
| 3,558,576 | 1/1971 | Weller .................. 528/493 |
| 3,562,227 | 2/1971 | Di Drusco et al. .................. 528/493 |
| 3,631,007 | 12/1971 | Diliddo .................. 528/493 |
| 3,661,884 | 5/1972 | Shell et al. .................. 528/493 |
| 3,676,419 | 7/1972 | Takehisa et al. .................. 528/493 |
| 3,803,111 | 4/1974 | Munro et al. .................. 528/493 |

*Primary Examiner*—William F. Hamrock
*Attorney, Agent, or Firm*—Charles B. Barris

[57] ABSTRACT

A process for preparing fine powder particles of thermoplastic elastomer polymer is disclosed. This process comprises suspending thermoplastic elastomer solids in a poor solvent for the polymer using mild agitation and then admixing this suspension with a non-solvent for the polymer in the presence of high shear mixing. Powder particles having an average diameter of less than about 100 microns are obtained.

6 Claims, No Drawings

4,330,672

THERMOPLASTIC ELASTOMER POWDER COATINGS

BACKGROUND OF THE INVENTION

Thermoplastic elastomers are polymeric materials that behave in some ways like thermoplastics and in other ways like elastomers. They behave like thermoplastics in that above their softening point they may be processed using ordinary plastics processing equipment. For example, they may be formed by thermoplastic injection molding, extrusion, blow molding, or vacuum forming. On the other hand, when utilized below their softening point, they behave like elastomers, i.e., they exhibit the properties normally associated with vulcanized rubbers without having been subjected to vulcanization. Thus, such polymers have the elastic and resilient properties of rubber but may be processed and reprocessed like ordinary thermoplastics.

Thermoplastic elastomers have been used in coating processes when applied from a solution of the thermoplastic elastomer. Application of coating materials by solution techniques, however, involves disadvantages such as environmental problems, handling problems, as well as the problems associated with the cost and removal of solvent from the coated article. The problems encountered using solution application techniques may be avoided by applying the polymer in the form of a powder, thus eliminating the need for solvent and the various problems associated therewith. Processes for preparing powder particles are well known to those skilled in the art. See, e.g., U.S. Pat. Nos. 2,999,788 and 3,737,400 which describe processes for preparing powder particles by dissolving the polymer in a solvent and then precipitating the polymer by adding the solution of polymer and solvent to a non-solvent for the polymer.

Small average diameter, i.e., less than about 150 microns, powder particles are especially useful in coating applications such as the application of a thin coating of powder particles to glass bottles to prevent shattering of the glass. It is difficult to prepare thermoplastic elastomers in fine powder form suitable for powder coating techniques such as electrostatic spray or fluidized bed applications. Grinding the thermoplastic elastomer does not produce a fine powder even when done at cryogenic temperatures such as under liquid nitrogen ($-196°$ C.). Thermoplastic elastomers do not produce fine powder particles when precipitated from solution such as by the process described in the above-identified United States patents since the solvent tends to swell the polymers sufficiently to cause the thermoplastic elastomer to coalesce or form large particles upon precipitation.

Thermoplastic elastomer powder particles have been prepared by emulsifying rubber solutions in water with an amine emulsifier and precipitating the emulsion. This process is described in U.S. Pat No. 3,923,707.

The search has continued for improved processes for preparing powder particles of thermoplastic elastomer polymers. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a process for preparing powder particles of thermoplastic elastomer polymers useful in coating applications.

Another object of the present invention is to provide powder particles having average diameters of less than about 150 microns.

Other objects and advantages of the invention will become apparent from the following summary and description of the preferred embodiments of the present invention.

In one aspect, the present invention provides a process for preparing powder particles of thermoplastic elastomer which comprises: (a) forming a suspension of a thermoplastic elastomer in a poor solvent, said thermoplastic elastomer comprising a block copolymer having at least two kinds of polymer blocks wherein one polymer block is designated by A and a second polymer block is designated by B such that each A is a polymer end block of a monovinyl arene or alpha alkyl monovinyl arene and each B is a polymer mid block derived from a conjugated diene; and refluxing said suspension in a manner and for a time sufficient to reduce said thermoplastic elastomer to fine agglomerated particles; (b) adding said suspension to a non-solvent to form a mixture of thermoplastic elastomer particles, poor solvent, and non-solvent, and subjecting said mixture to high shear mixing for a period of time sufficient to produce particles having an average diameter of less than about 100 microns and to render said thermoplastic elastomer particles hard, discrete and non-tacky; (c) recovering said thermoplastic elastomer polymer particles.

It has been found that thermoplastic elastomer polymers may be made into powder particles by the use of a "poor solvent"/"non-solvent" technique. The thermoplastic elastomer solid is suspended in a poor solvent (as defined herein) which does not dissolve the polymer. This poor solvent is incapable of dissolving the entire block copolymer which comprises the thermoplastic elastomer but does dissolve and/or swell and soften one of the block segments of the polymer only slightly, and, upon mild agitation during reflux, the polymer mass gets broken down into fine particles which agglomerate. A suspension comprising the small agglomerated polymer particles in the poor solvent is thus obtained. When this suspension is added to a non-solvent (as defined herein) for the polymer in the presence of high shear mixing, the poor solvent diffuses out into the non-solvent, and the agglomerates are broken up and the resulting fine particles then are surrounded by a sheath of non-solvent which makes them hard, discrete, and non-tacky.

DESCRIPTION OF THE PREFERRED EMBODIMENTS

The first step of the instant process comprises forming a suspension of thermoplastic elastomer solid in a poor solvent for the same. Said poor solvent is herein defined to be a polar organic liquid having a solubility parameter within specifically defined limits as described hereinafter. The suspension is then refluxed in the poor solvent with mild agitation so as to break down the thermoplastic elastomer into small particles. Thermoplastic elastomer starting materials useful in the process of the present invention are elastomeric solids which contain crystalline and/or thermoplastic portions arranged in block form.

The initial configuration of the thermoplastic elastomer polymer which is suspended and refluxed is not critical and may be in any form such as crumbs, large granules, or bales.

The preferred thermoplastic elastomers useful in the present invention typically are block copolymers having at least two kinds of polymer blocks. Such block copolymers are described in "*Applied Polymer Science,*" Chapter 29, p. 394ff, of Organic Coatings and Plastics Chemistry (Craver & Tess, 1975) which is herein incorporated by reference.

Preferred thermoplastic elastomer block copolymers for use in the present invention are radial or branched block copolymers. By "radial" or "branched" copolymers is meant copolymers having the general configuration $$Z-(BA)_n \qquad (I)$$

wherein each A group is a terminal block segment comprising a polymer made from a monovinyl arene or alpha alkyl monovinyl arene and each B is a block segment comprising a polymer made from a conjugated diene, Z is derived from a polyfunctional compound having at least three reactive sites, and n is not less than 3. The radial block copolymer, as herein defined, must have at least three block copolymer branches radiating from a nucleus Z.

The "Z" group which forms the nucleus from which the polymer blocks of the radial block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. A preferred polyfunctional compound is a silica containing compound.

Preferably the monovinyl arene or alpha alkyl monovinyl arene polymer block segments have a number average molecular weight of from about 5,000 to about 75,000. The conjugated diene derived polymer block preferably has a number average molecular weight of from about 30,000 to about 300,000. The conjugated diene polymer block is preferably a homopolymer and is preferably derived from conjugated dienes having from about 4 to about 10 carbon atoms per molecule.

The preparation of the preferred radial block copolymers of this invention may be by any technique known to those skilled in this art, such as those described in U.S. Pat. Nos. 3,932,327, 3,692,874 and 3,281,383, the disclosures of which are all hereby incorporated by reference.

These radial block copolymers are available commercially as Solprene TM thermoplastic elastomers.

A subgroup of suitable block copolymers comprises those thermoplastic elastomers in which the olefinic double bonds in the diene polymer blocks are converted to saturated hydrocarbon units by selective hydrogenation of the preformed block copolymer. The object of the hydrogenation is to improve the environmental resistance of the olefinically unsaturated block copolymer, particularly its resistance to light, oxygen, ozone, and heat. The thermoplastic elastomeric block copolymers useful in the present invention therefore can be partially or completely selectively hydrogenated as described in U.S. Pat. No. 3,810,957, which is herein incorporated by reference.

The thermoplastic elastomers useful in the present invention comprise generally from about 5 to about 50%, typically from about 10 to about 40%, and preferably from about 15 to about 35% by weight monovinyl or alpha alkyl monovinyl arenes and generally from about 50 to about 95%, typically from about 60 to about 90%, and preferably from about 65 to about 85% by weight conjugated diene.

The monovinyl arene or alpha alkyl monovinyl arene useful as the aromatic block of the thermoplastic elastomer includes styrenes, alpha alkyl styrenes said alkyl group preferably having from about 1 to about 5 carbon atoms, ring alkylated styrenes preferably ring alkylated styrenes wherein the alkyl group contains from about 1 to about 5 carbon atoms such as vinyl toluene and t-butyl styrene, alpha, alpha dialkyl styrenes preferably alpha, alpha dialkyl styrenes wherein the alkyl group contains from about 1 to about 5 carbon atoms, ring halogenated styrenes such as the chlorostyrenes, vinyl naphthalenes and the like or mixtures thereof. Styrene and alpha methyl styrene are preferred.

These arene monomers may contain minor proportions, based on the arene, of copolymerizable monomers that have conjugated double bonds such as conjugated dienes, vinyl pyridines, and the like.

The preferred conjugated dienes useful in preparing the thermoplastic elastomer include butadiene, alkyl substituted butadienes such as isoprene, 2,3-dimethyl butadiene, ethyl butadiene, methyl pentadiene, (piperylene) and the like, or mixtures thereof. The alpha, gamma conjugated butadienes are preferred. Unsubstituted alpha, gamma butadiene is particularly preferred.

The conjugated diene blocks also include diene copolymers containing up to 35% by weight in block B of a monovinyl arene such as styrene or alpha methyl styrene distributed therein in a non-block, i.e., random or tapered configuration.

A typical, but by no means exhaustive, list of suitable block polymers includes the following:
Polystyrene-polybutadiene-polystyrene;
Polystyrene-polyisoprene-polystyrene;
Polystyrene-polybutadiene-(polybutadienepolystyrene)$_{2-5}$;
Polystyrene-(polyisoprene-polystyrene)$_{2-5}$;
Polystyrene-poly(ethyl-butadiene)-polystyrene;
Polystyrene-poly(random butadiene-styrene)polystyrene;
Poly(alpha-methylstyrene)-polybutadiene-poly(alpha-methylstyrene);
Poly(alpha-methylstyrene)-polyisoprene-poly(alpha-methylstyrene);
Poly(styrene-alpha-methylstyrene)-poly(-butadieneisoprene) (styrene-alpha-methylstyrene); and
Polyvinylxylene)-polybutadiene-poly(vinylxylene).
Note that the subscript 2-5 to the above block copolymers represents a typical number of repeat blocks in radial block copolymers.

The number average molecular weight of the thermoplastic elastomers useful in the present invention may be generally from about 15,000 to about 150,000, typically from about 30,000 to about 100,000, and preferably from about 50,000 to about 80,000.

The conjugated diene portion of the thermoplastic elastomer may be hydrogenated to any degree including substantially complete saturation whereas the aromatic portion is preferably left substantially unhydrogenated, e.g., less than 5%, preferably less than 2% hydrogenated. The conjugated diene portions of the thermoplastic elastomers useful in the present invention are, when hydrogenated, preferably hydrogenated to generally at least about 10%, typically at least about 50%, and preferably at least about 98%. Substantially complete hydrogenation of the conjugated diene portion is preferred.

Other additives may also be present in the thermoplastic elastomer such as conventional UV stabilizers, and melt flow modifiers such as those described in U.S. Pat. No. 4,163,031 the disclosure of which is herein incorporated by reference. Typical of such melt flow modifiers include partially hydrogenated monovinyl arene homopolymers, alpha alkyl monovinyl arene homopolymers, and copolymers of monovinyl arenes and alpha alkyl monovinyl arenes either with each other or with other comonomers.

The identity of the poor solvent (poor in terms of the entire block copolymer) is based on its solubility parameter ($\delta$) and the relationship of this solubility parameter to the solubility parameter of the vinyl aromatic block of the block copolymer which comprises the thermoplastic elastomer.

The solubility parameter ($\delta$) of the poor solvent is calculated according to the formula:

$$\delta = (\Delta E/V)^{\frac{1}{2}}$$

where E is the energy of vaporization to a gas at zero pressure (i.e., an infinite separation of the molecules), and V is the molar volume of the component present.

The dimensions of $\delta$ are (calories per cubic centimeter)$^{\frac{1}{2}}$. Since it is possible to ascertain $\Delta E$ and V for most vaporizable liquids, the value of the solubility parameter ($\delta$) may be calculated from the heat of vaporization $\Delta H$. It can be shown that $$\Delta E_{25° C.} = \Delta H_{25° C.} - 592$$

Since the value of $\Delta H$ at 25° C. for most compounds may be found in the literature, this value may be used to calculate $\Delta E$ and then ($\delta$). Further details on solubility parameters and means for their calculation are found in an article entitled *Solubility Parameter Values* by H. Burrell and B. Immergut at p. IV-341, of Polymer Handbook edited by J. Brandrup and E. H. Immergut, 3rd Edition Interscience Publ., June 1967 the disclosure of which is herein incorporated by reference.

The solubility parameter of a polymer, however, usually cannot be determined directly because most polymers cannot be vaporized without decomposing. The solubility parameter of the vinyl aromatic polymer which is eventually incorporated into the block copolymer (i.e., the (A) block of formula I) is therefore defined herein to be the same as that of a solvent in which the polymer will mix (a) in all proportions, (b) without heat effect, (c) without volume change and (d) without reaction or any special association.

In view of the above, the poor solvent which is employed in accordance with the process of the present invention is herein defined to be a polar organic liquid which is non-reactive with the thermoplastic elastomer and possesses a solubility parameter ($\delta$) of from about 110 to about 122%, preferably from about 110 to about 115%, and most preferably from about 110 to about 112% of the solubility parameter of the vinyl aromatic polymer (i.e., defined by the (A) block of formula I), which eventually forms part of the aforedescribed block copolymer defined in formula I. Thus, the solubility parameter of an appropriate vinyl aromatic polymer which is intended to be incorporated into the block copolymer is first determined and the selection of an appropriate poor solvent is then based on it having a solubility parameter within the aforedescribed range.

For example, in a thermoplastic elastomer comprising a block copolymer of butadiene and styrene, (e.g., 40:60 w/w%) the styrene homopolymer block possesses a solubility parameter of about 9.0. Consequently, the poor solvent selected will have a solubility parameter of from about 9.9 to about 11.0, typically from about 9.9 to about 10.5 and preferably from about 9.9 to about 10.2.

By way of explanation and without wishing to be bound by any particular theory it is believed that the poor solvent (i.e., polar organic liquid) dissolves or at least swells the polar vinyl aromatic portion of the block copolymer while the non-polar conjugated diene block of the block copolymer is oriented away from, and is insoluble in, the polar poor solvent. It is for this reason that the solubility parameter of the poor solvent is believed to be a function of the solubility parameter of the vinyl aromatic block. If a poor solvent is selected to dissolve the conjugated diene block it is believed that the resulting particles would be tacky when contacted with the non-solvent and would agglomerate. This would destroy the fine powder configuration sought to be obtained. In contrast, when the poor solvent as defined herein is displaced by the non-solvent as described hereinafter, the resulting particles are not tacky and upon high shear mixing do not agglomerate to any significant degree.

Thus, the selection of a poor solvent having the proper solubility parameter is critical to achieve the desired results of the present invention. For example, the use of a poor solvent having a solubility parameter of less than 9.9 to produce a powder of a thermoplastic elastomer comprising styrene and butadiene copolymer blocks will not produce powders. Thus, if a 97% by weight methyl ethyl ketone and 3% by weight water mixture (solubility parameter of the mixture is 9.8) is used, a very low yield (about 5%) of fine powder (average diameter less than 100 microns) is obtained using the abovedescribed procedure, whereas if a 96% by weight methyl ethyl ketone and 4% by weight water mixture (solubility parameter of the mixture is 9.9) is used, a high yield (about 75%) of fine powder (average diameter less than 100 microns) is obtained.

If the solubility parameter of the poor solvent is too high in relation to that of the vinyl aromatic block the poor solvent will not dissolve or swell the same and no fine powder particles will be produced.

Representative examples of suitable poor solvents and their associated solubility parameter in (cal/cc)$^{\frac{1}{2}}$ which can be employed in conjunction with styrene-butadiene thermoplastic elastomers include acetone (10.0), a mixture of 96% by weight methyl ethyl ketone and 4% by weight water (9.9) ethylene glycol monoethyl ether (10.5), dichlorobenzene (10.0) and ethylene glycol diacetate. When mixtures of suitable poor solvents are employed the volume weighted average of solubility parameters of the components of the mixture must be within the appropriate range.

Obviously the identity of the poor solvent will vary as the solubility parameter of the vinyl aromatic portion of the block copolymer varies.

The thermoplastic elastomer solid is mixed with the poor solvent using mild agitation at reflux for a period of generally from about 1 to about 60 min., typically from about 5 to about 40 min., and preferably from about 10 to about 20 minutes. By "mild agitation" is meant stirring with a suitable mixer or blender (such as a Waring blender or magnetic stirrer) at a rate of generally less than about 200, typically less than about 150, and preferably less than about 100 rotations per minute using a Waring blender or other equivalent means.

The suspension of thermoplastic elastomer and poor solvent comprises generally from about 5 to about 25%, typically from about 5 to about 20%, and preferably from about 5 to about 10% by weight thermoplastic elastomer, and generally from about 95 to about 75%, typically from about 95 to about 80%, and preferably from about 95 to about 90% by weight poor solvent based on the total weight of the thermoplastic elastomer and poor solvent.

When the theromplastic elastomer solid is mixed with the poor solvent for a sufficient period of time, the solid is broken down into fine particles. However, because a portion of the block copolymer is dissolved or swelled in the poor solvent such particles generally agglomerate to some extent. Typically, such fine particles in their unagglomerated state will be less than about 350 microns, preferably less than about 300 microns and most preferably less than about 250 microns. A suspension comprising these fine agglomerated particles in the poor solvent is thus obtained.

The second step of the instant process comprises adding the suspension formed in the first step to a non-solvent. The non-solvent is herein defined to be a polar liquid which is miscible with the poor solvent used in the previous step, nonreactive with the thermoplastic elastomer, and possessive of non-solvent properties with respect to the thermoplastic elastomer. A liquid will be considered a non-solvent for the thermoplastic elastomer when it possesses a solubility parameter of greater than about 140%, preferably greater than about 160%, and most preferably greater than about 200%, of the solubility parameter of the thermoplastic elastomer.

For most thermoplastic elastomers it is sufficient if the solubility parameter of the non-solvent is greater than about 13, preferably greater than about 15, and most preferably greater than about 18.

Representative examples of suitable non-solvents and their associated solubility parameters in (cal./cc.)$^{\frac{1}{2}}$ include water (23.4), methanol (14.5), maleic anhydride (13.6), ethylene glycol (14.6), glycerol (16.5), and formamide (19.2). Mixtures of suitable liquids wherein the volume weighted average of the solubility parameters of the components of the mixture are within acceptable limits may also be employed.

The preferred non-solvents include water and methanol.

While adding the suspension of particles in the poor solvent to the non-solvent, the non-solvent is subjected to high shear mixing. By "high shear mixing" is meant agitation in a high speed mixer or blender (such as a Waring blender or a Dispax mill), or a high shear mixing device at a rate of generally greater than about 500 r.p.m., typically greater than about 1000 r.p.m., and preferably greater than about 2000 r.p.m. The use of such high shear mixing breaks up the agglomerated fine particles from the previous step and to some extent reduces their average diameter even further. Such high shear mixing is essential to produce a high yield of fine particle size average diameter (less than about 150 microns) polymer powder.

The suspension formed in step one may be added slowly to the non-solvent by means known to those skilled in this art. For example, the suspension may be added to the non-solvent dropwise or by a spraying technique or other means well known in this art.

When the fine suspension is added to the non-solvent, the poor solvent diffuses out into the non-solvent, and the particles then are surrounded by a sheath of non-solvent, which makes them hard, discrete, and non-tacky.

Such particles are hard in the sense that they are not pliable to the touch and non-tacky in the sense that the particles do not agglomerate to any significant extent when examined under a microscope.

Accordingly, the mixture of thermoplastic elastomer, non-solvent, and poor solvent is subjected to high shear mixing for a sufficient time to allow displacement of the poor solvent by the non-solvent as described above. Typically such times will vary from about 2 to about 10 min., and preferably from about 5 to about 10 min.

The amount of non-solvent to which the suspension of thermoplastic elastomer is added generally will comprise from about 2 to about 10, and preferably from about 2 to about 5 times the weight of the poor solvent in the suspension.

The third step of the instant process comprises recovering the powder particles by procedures well known to those skilled in this art. For example, the powder particles may be collected by filtration, followed by vacuum drying at room temperature.

Aside from the reflux step, the remainder of the steps of the present process may be carried out at any temperature which is such that the thermoplastic elastomer polymer will remain in the solid state and the liquids will remain in the liquid state. At atmospheric pressure, the present process (aside from the refluxing step) may be carried out at temperatures of generally from about 10° to about 25° C., typically from about 15° to about 25° C., and preferably from about 20° to about 25° C.

The present process may be carried out at superatmospheric, atmospheric, or subatmospheric pressures, although substantially atmospheric pressure is preferred.

The process of the present invention may be carried out in a batch, semi-continuous, or continuous manner, as desired.

The powder particles produced by the process of the present invention have average diameters generally less than about 100 microns, typically less than about 85 microns, and preferably less than about 75 microns.

These powder particles may be used generally in coating applications, and are particularly useful for coating returnable glass bottles which must withstand multiple caustic cleaning operations.

The present invention is further illustrated by the following examples. All parts and percentages in the examples as well as in the specification and claims are by weight unless otherwise specified.

EXAMPLE I 1.5 grams of a 15% by weight Solprene 414 solution (a product of Phillips Petroleum Company, comprising an S-B-S block copolymer of 60% butadiene and 40% styrene) is refluxed in 8.5 grams of acetone (solubility parameter 9.9 (cal./cc)$^{\frac{1}{2}}$) at a temperature of 40°–50° C. for approximately one hour. The solubility parameter of the styrene portion of the block copolymer is about 9.0 (cal./cc.)$^{\frac{1}{2}}$. Upon mild agitation with a Waring blender at a rate of 100 rotations per minute, the soft Solprene mass is broken down into fine particles which aggregate and a suspension comprising fine Solprene particles is formed. This suspension is then added slowly into 45 grams of water (solubility parameter 23.4 (cal./cc.)$^{\frac{1}{2}}$) in the presence of high shear mixing in a Dispax mill at a rate of 3,000 rotations per minute. As soon as the soft particles hit the water surface, acetone diffuses out into the water and the particles become hard and discrete. The particles are filtered and dried under vacuum at room temperature. The yield of fine powder having an average diameter less than 75 microns is found to be 99%. The entire process, aside from the refluxing step, is carried out at room temperature and substantially atmospheric pressure.

EXAMPLE II

Example I is repeated using a mixture of 96% by weight methyl ethyl ketone and 4% by weight water (solubility parameter of the mixture is 9.9 (cal./cc.)$^{\frac{1}{2}}$) in place of the acetone of Example I. The yield of fine powder having an average diameter less than about 100 microns is found to be 66%.

COMPARATIVE EXAMPLE I

Example I is repeated using methyl ethyl ketone (solubility parameter 9.3 (cal./cc.)$^{\frac{1}{2}}$) in place of acetone. Methyl ethyl ketone dissolves the polymer and is considered a true solvent for the polymer. When the methyl ethyl ketone polymer solution is added to the water, polymer precipitates out in the water as polymer strings. No powder particles are obtained.

COMPARATIVE EXAMPLE II

Comparative Example I is repeated using methylene chloride (solubility parameter 9.7 (cal./cc.)$^{\frac{1}{2}}$) instead of methyl ethyl ketone and methanol (solubility parameter 14.0 (cal./cc.)$^{\frac{1}{2}}$) instead of water. A polymer solution in methylene chloride is formed. Polymer precipitates in the form of strings (not fine powder) when this solution is added to methanol.

COMPARATIVE EXAMPLE III

Comparative Example I is repeated using hexane (solubility parameter 7.3 (cal./cc.)$^{\frac{1}{2}}$) in place of methyl ethyl ketone and methanol (solubility parameter 14.0 (cal./cc.)$^{\frac{1}{2}}$) in place of water. Hexane is not a poor solvent for the polymer as defined herein. It does not dissolve the polymer nor does it form a fine suspension. Instead, a soft, pasty polymer mass is obtained. Powder particles are not obtained when the polymeric mass is added to methanol.

The above examples and comparative examples establish that a small particle size powder (average diameter less than about 100 microns) may be obtained only when the solubility parameter of the poor solvent is as herein described.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. A process for preparing powder particles of thermoplastic elastomer which consists essentially of:
   (a) forming a suspension of a thermoplastic elastomer in a poor solvent, said thermoplastic elastomer comprising a block copolymer having at least two kinds of polymer blocks wherein one polymer block is designated by A and a second polymer block is designated by B such that each A is a polymer end block of a monovinyl arene or alpha alkyl monovinyl arene and each B is a polymer mid block derived from a conjugated diene, and said poor solvent being a polar organic liquid which is non-reactive with the thermoplastic elastomer and possesses a solubility parameter ($\delta$) of from about 110 to about 122% of the solubility parameter of the monovinyl arene or alpha alkyl monovinyl arene polymer comprising block A of said thermoplastic elastomer; and refluxing said suspension in a manner and for a time sufficient to reduce said thermoplastic elastomer to fine agglomerated particles;
   (b) adding said suspension to a non-solvent to form a mixture of thermoplastic elastomer particles, poor solvent, and non-solvent, and subjecting said mixture to high shear mixing for a period of time sufficient to produce particles having an average diameter of less than about 100 microns and to render said thermoplastic elastomer particles hard, discrete and non-tacky;
   (c) recovering said thermoplastic elastomer polymer particles.

2. The process of claim 1 wherein the thermoplastic elastomer is selected from the group consisting of block copolymers of styrene and butadiene.

3. The process of claim 2 wherein the poor solvent is selected from the group consisting of acetone and a mixture of 96% methyl ethyl ketone and 4% water, and the non-solvent is selected from the group consisting of water and methanol.

4. The process of claim 1 wherein the suspension of thermoplastic elastomer and poor solvent comprises from about 5 to about 25% thermoplastic elastomer and from about 95 to about 75% poor solvent; and said suspension is added to an amount of non-solvent which is from about 2 to about 10 times the weight of the poor solvent in said suspension.

5. A process for preparing thermoplastic elastomer powder particles of a block copolymer of styrene and butadiene having an average diameter of less than about 100 microns which consists essentially of:
   (a) forming a suspension of from about 5 to about 25% by weight of a thermoplastic elastomer block copolymer of styrene and butadiene in a poor solvent by refluxing the thermoplastic elastomer solid in said poor solvent, which is a polar organic liquid which is non-reactive with the thermoplastic elastomer and possesses a solubility parameter ($\delta$) of from about 110 to about 122% of the solubility parameter of styrene, for a period of from about 1 to about 60 minutes, with mild agitation at a rate of less than about 200 rotations per minute so as to break down the solid into fine agglomerated particles;
   (b) admixing said suspension with from about 200 to about 500% by weight, based on the weight of the poor solvent in said suspension, of water at a temperature of from about 10° to about 25° C. and at substantially atmospheric pressure in the presence of high shear mixing at a rate of more than about 500 rotations per minute; and
   (c) filtering said polymer particles from said liquid.

6. The process of claim 5 wherein the poor solvent is acetone and the non-solvent is water.

* * * * *